(12) United States Patent
Panthri et al.

(10) Patent No.: US 12,515,523 B2
(45) Date of Patent: Jan. 6, 2026

(54) SYSTEMS AND METHODS FOR VEHICLE INDICATOR FOR HITCHLESS TOWING

(71) Applicant: Toyota Motor Engineering & Manufacturing North America, Inc., Plano, TX (US)

(72) Inventors: Shaurya Panthri, Ann Arbor, MI (US); Christopher A. Ferone, Ann Arbor, MI (US)

(73) Assignees: Toyota Motor Engineering & Manufacturing North America, Inc., Plano, TX (US); Toyota Jidosha Kabushiki Kaisha, Toyota (JP)

(*) Notice: Subject to any disclaimer, the term of this patent is extended or adjusted under 35 U.S.C. 154(b) by 228 days.

(21) Appl. No.: 18/452,053

(22) Filed: Aug. 18, 2023

(65) Prior Publication Data

US 2025/0058788 A1   Feb. 20, 2025

(51) Int. Cl.
| | | |
|---|---|---|
| *B60K 35/28* | (2024.01) | |
| *B60K 35/23* | (2024.01) | |
| *B60W 30/165* | (2020.01) | |
| *B60W 40/105* | (2012.01) | |
| *B60W 50/14* | (2020.01) | |
| *B60W 60/00* | (2020.01) | |

(52) U.S. Cl.
CPC .......... *B60K 35/28* (2024.01); *B60W 30/165* (2013.01); *B60W 40/105* (2013.01); *B60W 50/14* (2013.01); *B60W 60/001* (2020.02); *B60K 35/23* (2024.01); *B60K 2360/177* (2024.01); *B60K 2360/178* (2024.01); *B60W 2050/146* (2013.01); *B60W 2300/14* (2013.01); *B60W 2554/80* (2020.02)

(58) Field of Classification Search
CPC ............... B60W 50/14; B60W 30/165; B60W 2050/146; B60W 2300/14; B60W 2554/80; B60W 2556/65; B60K 35/00; B60K 35/23; B60K 35/28; B60K 2360/177; B60K 2360/178
See application file for complete search history.

(56) References Cited

U.S. PATENT DOCUMENTS

| | | |
|---|---|---|
| 9,251,715 B2 | 2/2016 | Hing et al. |
| 10,281,721 B2 | 5/2019 | Bhalla |

(Continued)

OTHER PUBLICATIONS

Schwarz, et al. "Augmented reality warnings in vehicles: Effects of modality and specificity on effectiveness", Accident Analysis & Prevention, vol. 101, 2017.

(Continued)

*Primary Examiner* — Omeed Alizada
(74) *Attorney, Agent, or Firm* — Christopher G. Darrow; Darrow Mustafa PC

(57) ABSTRACT

Systems, methods, and other embodiments described herein relate to influencing control of a vehicle to improve hitchless towing. In one embodiment, a method includes detecting a current condition associated with a lead vehicle and a following vehicle. The method includes, responsive to determining that the current condition satisfies an adjustment threshold for modifying a behavior of at least one of the lead vehicle and the following vehicle, determining a vehicle action associated with the current condition. The method includes providing an output according to the vehicle action.

20 Claims, 7 Drawing Sheets

(56) References Cited

U.S. PATENT DOCUMENTS

| | | |
|---|---|---|
| 10,423,834 B2 | 9/2019 | Badalamenti et al. |
| 10,839,217 B2 | 11/2020 | Badalamenti et al. |
| 10,977,956 B1 | 4/2021 | Madison et al. |
| 11,055,924 B2 | 7/2021 | Navarro et al. |
| 11,304,071 B2 | 4/2022 | Cookman et al. |
| 11,501,657 B2 | 11/2022 | Madison et al. |
| 11,624,630 B2 | 4/2023 | Robeson et al. |
| 11,630,302 B1 | 4/2023 | Weiss et al. |
| 2016/0071418 A1* | 3/2016 | Oshida ............... B60W 30/165 701/23 |
| 2017/0287217 A1* | 10/2017 | Kim ...................... B62J 50/22 |
| 2022/0308577 A1* | 9/2022 | Pasch ...................... H04W 4/46 |
| 2023/0054037 A1* | 2/2023 | Switkes ................. G05D 1/244 |

OTHER PUBLICATIONS

Kettle, et al. "Augmented Reality for Vehicle-Driver Communication: A Systematic Review", Safety 8.4 (2022): 84.

\* cited by examiner

SYSTEMS AND METHODS FOR VEHICLE INDICATOR FOR HITCHLESS TOWING

TECHNICAL FIELD

The subject matter described herein relates, in general, to influencing control of a vehicle and, more particularly, to generating visual displays to assist with hitchless towing.

BACKGROUND

Despite the presence of relatively robust and sophisticated vehicle technologies, the efficient communication of vehicle information, alerts, warnings, and instructions can be difficult. That is, a vehicle communication, such as an audible cue, visual illustration, or textual prompt, may be ignored or misunderstood in vehicles that have autonomous driving capabilities.

Vehicle communications with a driver can be particularly challenging in towing conditions where certain thresholds are to be maintained. It is noted that automatic adjustment of driving characteristics, such as steering, braking, and acceleration, can be uncomfortable for some drivers while simple warnings can be ineffective in communicating the timing and intensity to correct, or prevent, a hazardous condition.

SUMMARY

In one embodiment, example systems and methods relate to a manner of influencing control of a vehicle to improve hitchless towing. By intelligently translating vehicle communications, such as warnings, instructions, and information, into a virtual vehicle conveyed to a driver via augmented reality, the communications can be more easily understood and carried out to mitigate or prevent dangerous vehicle events.

In one embodiment, a warning system is disclosed. The warning system includes at least a processor connected to a memory storing instructions that, when executed by the processor, cause the processor to perform various functions. The instructions include instructions to detect a current condition associated with a lead vehicle and a following vehicle. The instructions include instructions to, responsive to determining that the current condition satisfies an adjustment threshold for modifying a behavior of at least one of the lead vehicle and the following vehicle, determine a vehicle action associated with the current condition. The instructions include instructions to provide an output according to the vehicle action.

In one embodiment, a non-transitory computer-readable medium including instructions that, when executed by one or more processors, cause the one or more processors to perform one or more functions is disclosed. The instructions include instructions to detect a current condition associated with a lead vehicle and a following vehicle. The instructions include instructions to, responsive to determining that the current condition satisfies an adjustment threshold for modifying a behavior of at least one of the lead vehicle and the following vehicle, determine a vehicle action associated with the current condition. The instructions include instructions to provide an output according to the vehicle action.

In one embodiment, a method is disclosed. The method includes detecting a current condition associated with a lead vehicle and a following vehicle. The method includes, responsive to determining that the current condition satisfies an adjustment threshold for modifying a behavior of at least one of the lead vehicle and the following vehicle, determining a vehicle action associated with the current condition. The method includes providing an output according to the vehicle action.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
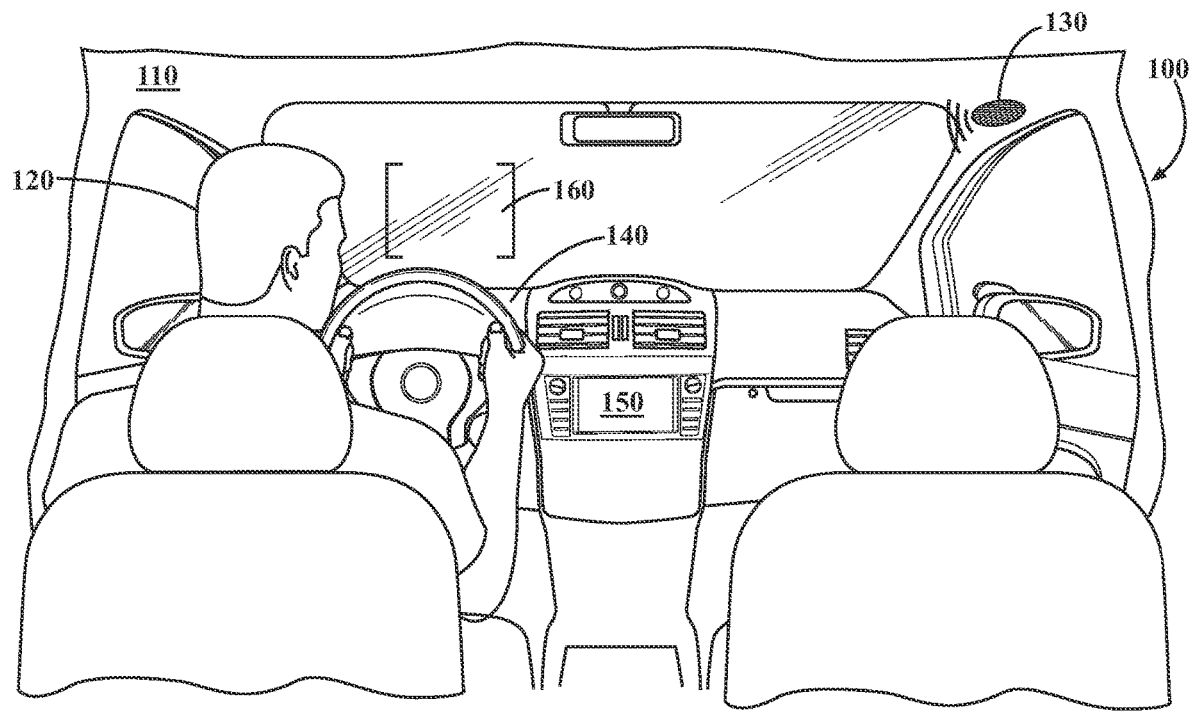
FIG. 1 illustrates one example of the interior of a vehicle with various interfaces.

Systems, methods, and other embodiments associated with influencing control of a vehicle to improve hitchless towing are disclosed herein. As previously described, various communications, such as alerts/warnings, can be ignored or unseen in vehicles equipped with modern audio/visual capabilities. Therefore, the presently disclosed systems and methods provide an explicit mechanism for conveying information about hitchless towing to a driver.

For example, in at least one approach, a warning system functions to monitor current conditions associated with hitchless towing. As an initial aspect, hitchless towing generally involves a lead vehicle "towing" a trailer (also described as a following vehicle here). However, in hitchless towing, there is no physical connection between the lead vehicle and the following vehicle. Instead, the trailer is, in at least one embodiment, a self-contained vehicle that operates autonomously to follow the lead vehicle. In general, the hitchlessly towed vehicle/trailer maintains a defined distance from the lead vehicle. Accordingly, when the distance grows such that another vehicle can intervene between the lead vehicle and the following vehicle or the distance lessens such that the distance is not adequate to maintain, for example, safe stopping distances, then the hitchless towing may encounter various difficulties, such as safety, losing the trailer in traffic, and so on.

As such, the warning system is able to monitor the current conditions associated with the hitchless towing and determine whether the defined distance is being maintained. Occurrences of variation in the defined distance may occur when, for example, the lead vehicle is manually controlled, and the driver accelerates too quickly or makes another unexpected maneuver. In further examples, certain traffic events may occur that cause the lead vehicle and/or the following vehicle to adapt vehicle dynamics according to the traffic events, thereby causing variations in a distance between the vehicles that varies from a range of the predefined distance.

In any case, the warning system monitors the current conditions and determines when the current conditions satisfy an adjustment threshold. The current conditions may satisfy the adjustment threshold when the distance between the lead vehicle and the following vehicle are outside of the predefined distance/range, when a relative speed between vehicles exceeds (in either a positive or negative form) a defined speed range, and so on. From this, the warning system generates a vehicle action that is derived to correct the variance between the vehicles. The warning system then, in one configuration, generates and provides an output to cause the vehicles to adapt driving behavior. Thus, the warning system may generate various graphics within an augmented reality display depicting a virtual vehicle performing a behavior that is selected to influence the lead vehicle to perform the vehicle action. For example, the warning system may depict the virtual vehicle braking in order to induce the lead vehicle to brake. In another example, the warning system may depict the virtual vehicle speeding away in order to induce the lead vehicle to accelerate. In this way, the disclosed systems, methods, and other embodiments improve the communication of information to the driver about hitchless towing.

FIG. 1 illustrates an example environment 100 in which assorted embodiments of a warning system can be practiced. The environment 100 depicts an interior of a vehicle 110 where a driver 120 can interact with one or more interfaces to control and/or communicate with the computing components of the vehicle 110. While vehicles may communicate with a driver 120 via relatively simple audible cues from speakers 130 and visual lights from a dashboard 140, the advent of touch-based displays allows interaction in a variety of ways. For example, text messages, graphics, videos, and interactive prompts can be employed from displays within the dashboard 140 and/or central console 150. The heads-up display 160 permits display of features to convey a variety of different, or similar, information to the driver 120. However, the array of interfaces can be overwhelming, particularly when large volumes of information are conveyed or automated driving conditions are present. As a result, the use of the assorted interfaces can be inefficient at informing the driver 120 about various conditions.

Figure 2:
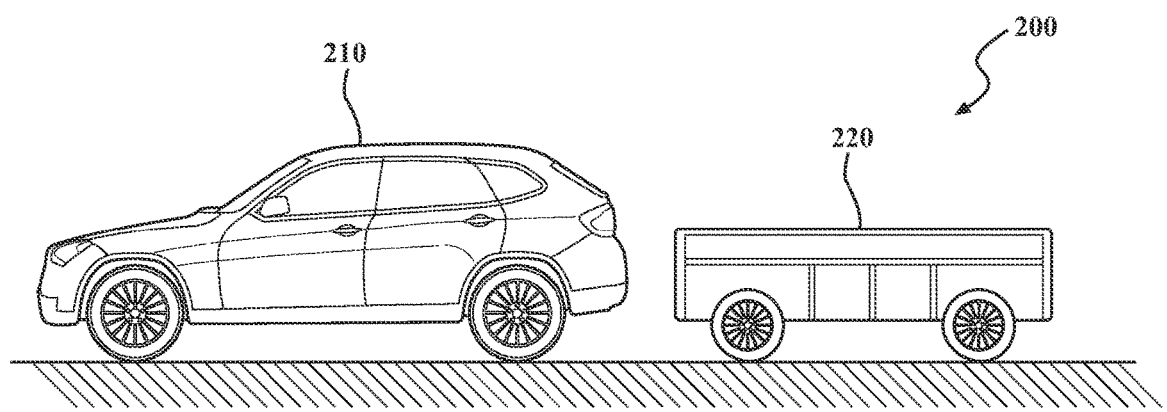
FIG. 2 illustrates an example of hitchless towing in which a lead vehicle is hitchless towing a following vehicle.

FIG. 2 illustrates portions of another example environment 200 where embodiments of a warning system can be employed to improve communication of information about hitchless towing. A hitchless towing configuration is illustrated in FIG. 2 as an arrangement in which a lead vehicle 210 is not physically connected with a following vehicle 220, but the following vehicle 220 follows the lead vehicle 210 in a similar manner as a trailer and, in general, through implementation of autonomous driving controls within the following vehicle 220. In one arrangement, the lead vehicle 210 dictates the activity and travel of the following vehicle 220, such as a direction of movement, speed, braking, and traffic maneuvers. In various configurations, the lead vehicle 210 may communicate directly with systems of the following vehicle 220 or the following vehicle 220 may base behaviors off of observed maneuvers of the lead vehicle 210.

While some vehicle alerts and warnings can convey information to an occupant about a towing configuration, such alerts and warnings can be easily misunderstood or interpreted for towing. That is, warnings, alerts, and/or instructions that are relatively straightforward and easy to implement for non-towing arrangements can be more complex and relatively difficult in a hitchless towing context to translate into the proper vehicle controls to mitigate, or prevent, hazards and/or safety conditions. As a further aspect, the ability to provide automated vehicle controls can ensure corrective actions in response to vehicle communications but can be uncomfortable and dangerous if drivers for either vehicle 210/220 react suddenly to unexpected, automated vehicle behavior.

It is noted that vehicle communications can be delayed, incomplete, or misunderstood for a variety of different reasons as driving conditions are rarely static. For example, a message to speed up to avoid the following vehicle 220 from contacting the lead vehicle 210 may not be received in time or may not directly convey how much acceleration is needed to avoid contact between the vehicles 210/220. As another example, a vehicle warning of excessive speed through a turn may be misunderstood in relation to an intensity and/or duration of braking to navigate the turn safely.

The fact that vehicle communications (i.e., alerts/warnings and other indicators) may be delayed, misunderstood, or ignored can be compounded in towing arrangements where multiple vehicles 210/220 are involved and are susceptible to tighter safety tolerances during travel. In other words, in certain circumstances, towing configurations can more quickly exceed safe driving conditions than individual vehicles and, as such, understanding and recognition of warnings and instructions have shorter time horizons, which can be difficult for a driver to accurately interpret in dynamic driving environments. Accordingly, various embodiments are directed to intelligently creating augmented reality content that efficiently communicates vehicle warnings, alerts, instructions, prompts, and directions in a manner that can be easily understood by a driver and translated into vehicle actions that mitigate, or eliminate, current and/or future hazards and safety conditions in driving configurations involving a single vehicle or vehicles 210/220 connected in a hitchless towing arrangement.

Figure 3:
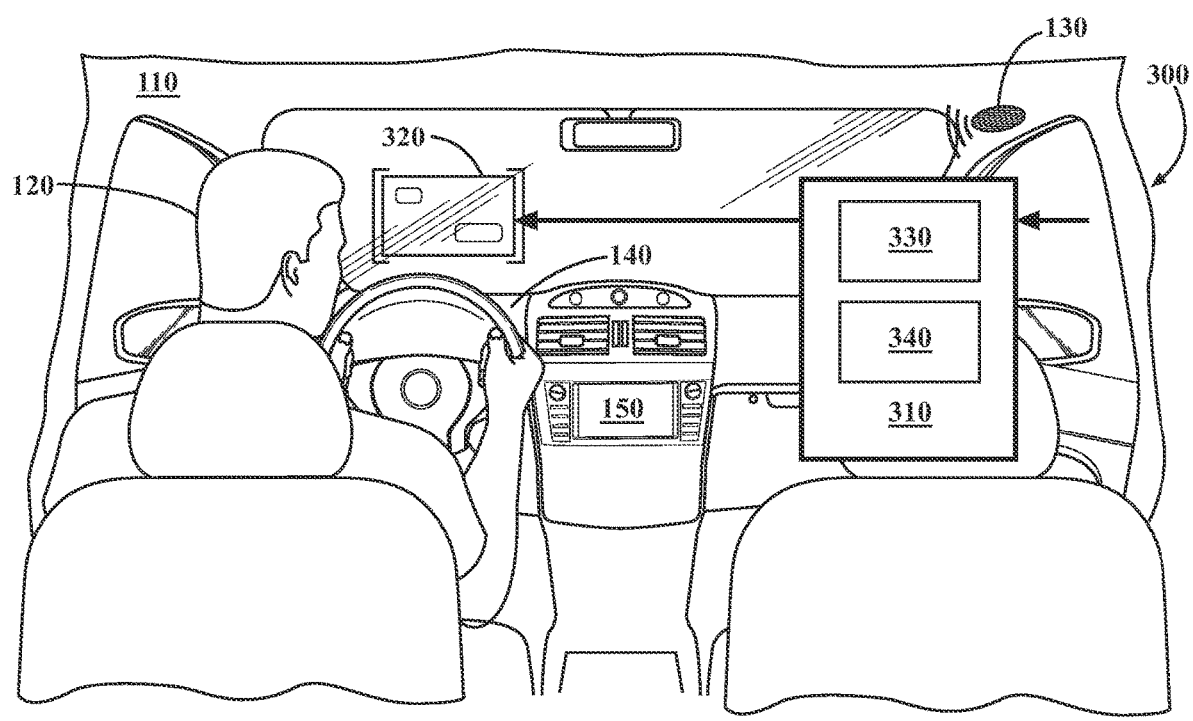
FIG. 3 illustrates one example of an environment in which a warning system may be implemented.

FIG. 3 illustrates portions of an example vehicle environment 300 in which a warning system 310 can be utilized to intelligently communicate with a driver 120. It is noted that various embodiments provide communications with the driver 120 via an augmented reality (AR) interface 320, which may be similarly configured and placed compared to the heads-up display 160 of FIG. 1, the content generated by the warning system 310 may be shown on any screen, surface, panel, or interface positioned inside a passenger cabin of the vehicle 110, which can be generally characterized as a vehicle display.

In accordance with some embodiments, the warning system 310 translates input information, such as detected and predicted driving conditions (also referred to as current conditions) into a warning strategy that corresponds with digital content that can be output on available vehicle displays. In one approach, the warning system 310 may be present as hardware and/or software within the chassis of the vehicle 110 to provide a processor 330 and memory 340 that generates and selectively executes one or more warning strategies. Thus, the warning system 310 can provide a vehicle communication as rendering of a virtual vehicle that conveys the intent of the vehicle communication in a more easily understood manner than other vehicle warnings that involve text, figures, and symbols.

As a result of rendering a virtual vehicle, driver reaction time can be reduced while increasing the accuracy of vehicle actions to correct, mitigate, or prevent dangerous conditions and/or driving hazards. In other words, translating vehicle communications into one or more virtual vehicles rendered and displayed provides a visual mechanism akin to the presence of an actual vehicle in the surrounding environment that, for example, triggers muscle memory and cognitive relevance to prior driving experiences, thereby providing understanding of not only what is happening, but also what driving actions are needed to avoid, mitigate, or prevent current and/or future hazards and dangerous conditions.

It should be appreciated that the current conditions identified by the warning system 310, involves the warning system 310 acquiring various information inputs about, for example, the driver, the vehicle, and roadway conditions in order to identify salient aspects and determine vehicle actions. For instance, the warning system 310 can correlate information from one or more sensors of the vehicle into vehicle actions and convey the vehicle actions through display of the virtual vehicle. Broadly, the warning system 310 may generate various outputs using the virtual vehicle display that proactively, or reactively, convey instructions to the driver 120 about current driving conditions and upcoming hazards, which trigger the driver 120 to respond in the form of vehicle actions.

As a non-limiting example, detected driver behavior and/or upcoming roadway hazards can prompt the warning system 310 to generate a warning to increase driver awareness and slow down. It is contemplated that, in at least one approach, the warning system 310 proactively generates multiple different warning strategies that respectively translate vehicle communications to different virtual vehicle behaviors that can be selected in response to a variety of factors, such as detected driver behavior, existing driver profile, or computed effectiveness of previous vehicle communications.

Through the implementation of the warning system 310, vehicle communications can be more efficiently generated and conveyed to a driver. By identifying what information is being communicated to a driver 120, the warning system 310 can utilize the intelligent translation of vehicle communications to augmented reality content from a warning strategy to optimize driver engagement.

Figure 4:
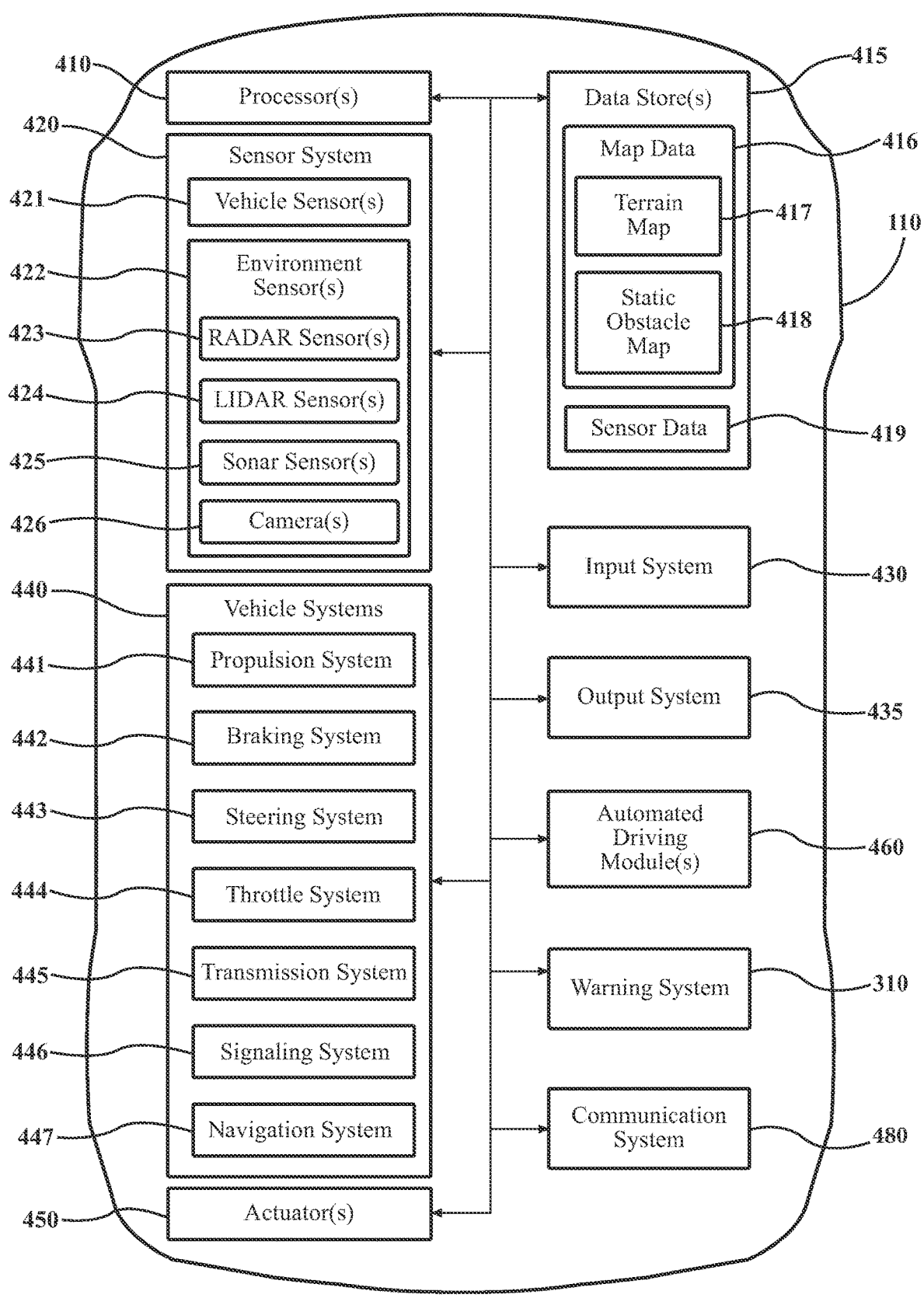
FIG. 4 illustrates one embodiment of a vehicle within which systems and methods disclosed herein may be implemented.

Referring to FIG. 4, an example of a vehicle 110 is illustrated. As used herein, a "vehicle" is any form of powered transport. In one or more implementations, the vehicle 110 is an automobile. While arrangements will be described herein with respect to automobiles, it will be understood that the described embodiments are not limited to automobiles. The vehicle 110 also includes various elements. It will be understood that in various embodiments it may not be necessary for the vehicle 110 to have all of the elements shown in FIG. 4. The vehicle 110 can have different combinations of the various elements shown in FIG. 4. Further, the vehicle 110 can have additional elements to those shown in FIG. 4. In some arrangements, the vehicle 110 may be implemented without one or more of the elements shown in FIG. 4. While the various elements are shown as being located within the vehicle 110 in FIG. 4, it will be understood that one or more of these elements can be located external to the vehicle 110. Further, the elements shown may be physically separated by large distances. For example, as discussed, one or more components of the disclosed system can be implemented within a vehicle while further components of the system are implemented within a cloud-computing environment or other system that is remote from the vehicle 110.

Some of the possible elements of the vehicle 110 are shown in FIG. 4 and will be described along with subsequent figures. However, a description of many of the elements in FIG. 4 will be provided after the discussion of FIGS. 5-9 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, the vehicle 110 includes the warning system 310 that is implemented to perform methods and other functions as disclosed herein relating to improving the communication of information about hitchless towing using displays to render a virtual vehicle.

As will be discussed in greater detail subsequently, the warning system 310, in various embodiments, is implemented partially within the vehicle 110, and as a cloud-based service. For example, in one approach, functionality associated with at least one module of the warning system 310 is implemented within the vehicle 110 while further functionality is implemented within a cloud-based computing system. Thus, the warning system 310 may include a local instance at the vehicle 110 and a remote instance that functions within the cloud-based environment.

Moreover, the warning system 310, as provided for within the vehicle 110, functions in cooperation with a communication system 480. In one embodiment, the communication system 480 communicates according to one or more communication standards. For example, the communication system 480 can include multiple different antennas/transceivers and/or other hardware elements for communicating at different frequencies and according to respective protocols. The communication system 480, in one arrangement, communicates via a communication protocol, such as a WiFi, DSRC, V2I, V2V, or another suitable protocol for communicating between the vehicle 110 and other entities in the cloud environment. Moreover, the communication system 480, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 110 communicating with various remote devices (e.g., a cloud-based server). In any case, the warning system 310 can leverage various wireless communication technologies to provide communications to other entities, such as members of the cloud-computing environment.

Figures 5, 6:
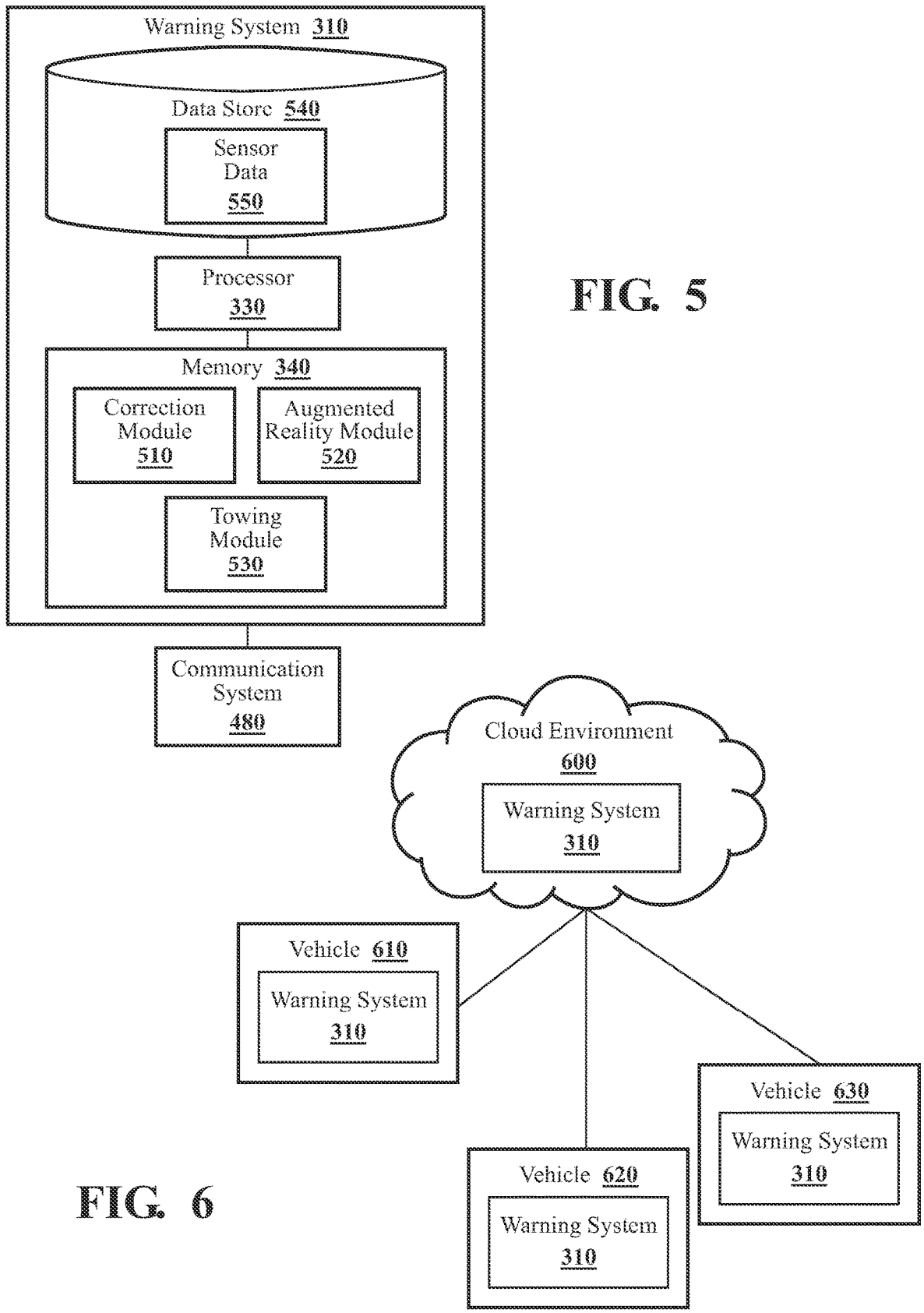
FIG. 5 illustrates one embodiment of a warning system that may be implemented in the vehicle of FIG. 4.
FIG. 6 illustrates one embodiment of an example warning system employed in a cloud-computing environment.

With reference to FIG. 5, one embodiment of the warning system 310 is further illustrated. The warning system 310 is shown as including a processor 330 (also referred to as processor 410 in FIG. 4) from the vehicle 110 of FIGS. 1 and 3. Accordingly, the processor 330/410 may be a part of the warning system 310, the warning system 310 may include a separate processor from the processor 330/410 of the vehicle 110, or the warning system 310 may access the processor 330/410 through a data bus or another communication path that is separate from the vehicle 110. In one embodiment, the warning system 310 includes a memory 340 that stores a correction module 510, an augmented reality module 520, and a towing module 530. The memory 340 is a random-access memory (RAM), read-only memory (ROM), a hard-disk drive, a flash memory, or another suitable memory for storing the modules 510/520/530. The modules 510/520/530 are, for example, computer-readable instructions that, when executed by the processor 330, cause the processor 330 to perform the various functions disclosed herein. In alternative arrangements, the modules 510/520/530 are independent elements from the memory 340 that are, for example, comprised of hardware elements. Thus, the modules 510/520/530 are alternatively ASICs, hardware-based controllers, a composition of logic gates, or another hardware-based solution.

With continued reference to FIG. 5, each module 510/520/530 can generally include instructions that function to control the processor 330 to receive data inputs from one or more sensors of the vehicle 110. The inputs are, in one embodiment, observations of an environment proximate to the vehicle 110, and/or other aspects about the surroundings. As provided for herein, the respective modules 510/520/530, in one embodiment, acquires sensor data 550 that includes at least camera images, and other data about observations of the surrounding environment embodying objects, conditions, and other information. In general, the sensor data 550 may provide the warning system with information about velocities, forces, accelerations, temperatures, humidity, and wind speeds from the vehicle 110 and/or external to the vehicle 110 along with other information. In further arrangements, one or more module 510/520/530 acquires the sensor data 550 from further sensors such as a radar 423, a LiDAR 424, and other sensors as may be suitable for identifying vehicles and locations of the vehicles. Moreover, while the sensor data 550 is generally described as including information about the surrounding environment, the sensor data 550 may also include observations about an interior passenger compartment of the vehicle 110, and/or aspects about the vehicle itself, such as dynamics, etc.

Accordingly, the respective modules 510/520/530, in one embodiment, control the respective sensors to provide the data inputs in the form of the sensor data 550. Additionally, while the various modules 510/520/530 are discussed as controlling the various sensors to provide the sensor data 550, in one or more embodiments, the modules 510/520/530 can employ other techniques to acquire the sensor data 550 that are either active or passive. For example, the correction module 510 may passively retrieve the sensor data 550 from a stream of electronic information provided by the various sensors to further components within the vehicle 110. Moreover, the respective modules 510/520/530 can undertake various approaches to fuse data from multiple sensors when providing the sensor data 550 and/or from sensor data acquired over a wireless communication link (e.g., v2v) from one or more of the surrounding vehicles. Thus, the sensor data 550, in one embodiment, represents a combination of perceptions acquired from multiple sensors.

The sensor data 550 may include, for example, information about distances, relative speeds, and other information between a lead vehicle 210 and a following vehicle 220 in a hitchless towing configuration, and so on. Moreover, the modules 510/520/530, in one embodiment, control the sensors to acquire the sensor data 550 about an area that encompasses 360 degrees about the vehicle 110 in order to provide a comprehensive assessment of the surrounding environment. Of course, in alternative embodiments, at least one module 510/520/530 may acquire the sensor data about a single direction alone when, for example, the vehicle 110 is not equipped with further sensors to include additional regions about the vehicle and/or the additional regions are not scanned due to other reasons (e.g., unnecessary due to known current conditions).

The warning system 310, as illustrated in FIG. 5, is generally an abstracted form of the warning system 310 as may be implemented between the vehicle 110 and a cloud-computing environment. FIG. 6 illustrates one example of a cloud-computing environment 600 that may be implemented along with the warning system 310. As illustrated in FIG. 6, the warning system 310 is embodied, at least in part, within the cloud-computing environment 600. In one or more approaches, the cloud environment 600 may facilitate communications between multiple different vehicles to acquire and distribute information between vehicles 610, 620, and 630.

Accordingly, as shown, the warning system 310 may include separate instances within one or more entities of the cloud-based environment 600, such as servers, and also instances within vehicles that function cooperatively to acquire, analyze, and distribute the noted information. In a further aspect, the entities that implement the warning system 310 within the cloud-based environment 600 may vary beyond transportation-related devices and encompass mobile devices (e.g., smartphones). Thus, the set of entities that function in coordination with the cloud environment 600 may be varied.

With continued reference to FIG. 5, in one embodiment, the warning system 310 includes the data store 540. The data store 540 is, in one embodiment, an electronic data structure stored in the memory 340 or another data storage device and that is configured with routines that can be executed by the processor 330 for analyzing stored data, providing stored data, organizing stored data, and so on. Thus, in one embodiment, the data store 540 stores data used by the modules 510/520/530 in executing various functions. In one embodiment, the data store 540 stores the sensor data 550 along with, for example, metadata that characterize various aspects of the sensor data 550. For example, the metadata can include location coordinates (e.g., longitude and latitude), relative map coordinates or tile identifiers, time/date stamps from when the separate sensor data 550 was generated, and so on. In one embodiment, the data store 540 further includes assorted vehicle warnings, alerts, instructions, and prompts that can correspond with different conditions and situations.

The correction module 510, in one embodiment, includes instructions that cause the processor 330 to translate information collected concerning the vehicle 110, the driver 120, and a roadway embodying current conditions into one or more vehicle communications. That is, the correction module 510 acquires data, images, and other information from sensors of the vehicle 110, or from sources external to the vehicle 110, to identify salient aspects that may garner one or more warnings, alerts, and other instructions to the driver. It should be noted that while the virtual vehicle is generally described as one approach for communicating information, in some embodiments, the system 310 utilizes the correction module 420 to generate an interactive communication that has multiple stages involving audible, tactile, or gesture-based engagement.

The correlation of detected conditions into communications by the correction module 510 could correspond with the warning system 310 activating various warning lights, sounds, or textual cues. However, such communications can be easily ignored and/or misunderstood, as previously discussed. Accordingly, various embodiments are directed to utilizing the correction module 510 and other modules 430/440 of the warning system 310 to translate vehicle communications into augmented reality content that efficiently and accurately conveys the subject matter of the communication as well as what vehicle actions should be provided to prevent or mitigate various events, such as the distance between the leading vehicle and the following vehicle varying from a defined range.

As such, the correction module 510, in some embodiments, not only translates derivations about the sensor data 250 into vehicle communications, but also the vehicle communications into the vehicle actions and/or behaviors that are necessary to satisfy the intent of the communication into a particular format for output to the driver. In other words, the correction module 510 derives determinations from the sensor data 550 that are further developed into one or more vehicle actions intended to increase driving safety by accomplishing a directive of the communication. For example, the correction module 510 can translate a slow-down communication into vehicle braking intensity and duration by rendering a graphic of a virtual vehicle that induces that desired action. Another example utilizes the correction module 510 to create a communication about steering and/or another movement of the vehicle 110 that the system 310 translates into vehicle actions that entail moving to the right-most lane of a roadway and braking to a predetermined speed.

With the correction module 510 providing the communications and corresponding actions necessary to satisfy the communications to reduce an impact of a safety risk or other event, the augmented reality module 520, in one approach, generates virtual content that conveys a communication about the current condition and desired vehicle actions. That is, the augmented reality module 520 converts the vehicle communications and corresponding vehicle actions into virtual content that is displayed to a driver via augmented reality what is necessary to reduce and/or avoid dangerous conditions indicated by the communications.

While not limiting or required, embodiments of a warning system 310 employ the augmented reality module 520 to generate one or more virtual vehicles to convey vehicle communications associated with inducing performance of particular vehicle actions. It is noted that the virtual content created by the augmented reality module 520 may not explicitly state or show the vehicle communication or necessary vehicle control action but, instead, may show virtual vehicles and environment to convey the actions necessary to avoid and/or remedy an event, such as becoming out of sync (e.g., moving outside of a defined range) with a following vehicle. For example, instead of displaying text or symbols to convey a slow-down vehicle message, the augmented reality module 520 can generate a virtual vehicle that slows, closes a distance with the leading vehicle, and displays brake lights, thereby communicating that conditions indicate that the driver should control the vehicle 110 to decelerate.

Accordingly, the augmented reality module 520, in one embodiment, translates the vehicle actions to address a current condition between the lead vehicle and the following vehicle into corresponding actions of a virtual vehicle in the form of graphically animated actions of the virtual vehicle with the augmented reality or other display. The augmented reality module 520 is able to generate graphics of the virtual vehicle acting in various ways (e.g., accelerating, decelerating, steering, etc.) in order to induce desired behavior in the vehicles 210/220. For instance, the augmented reality module 520 can generate a virtual vehicle undertaking various maneuvers and also in different forms. As one example, by adjusting the type, size, and motion of a virtual vehicle, the augmented reality module 520 can customize digital content to what best conveys the vehicle communication to a driver 120 and induces the intended corrective vehicle actions.

Similarly, the augmented reality module 520 can alter the virtual environment in which augmented reality content is conveyed to a driver 120. The customization of the virtual environment can further enhance the speed and accuracy of driver 120 comprehension. For example, different types of roadways, scenery, and traffic can be employed as a virtual environment, as selected by the augmented reality module 520. In at least one arrangement, the augmented reality module 520 customizes the delivery of vehicle communications through one or more virtual vehicles existing in the selected virtual environment. That is, the module 430 generates the graphics in a way that is, for example, particular to a respective driver as may have been learned through feedback about whether the driver undertakes a desired actions responsive to display of the virtual vehicle.

The ability to adapt the vehicles and/or environment in which vehicle communications are conveyed to a driver allows the warning system 310 to adapt to different drivers. As an example, an inattentive driver may be shown a virtual environment with bright colors, eye-catching scenery, and moderate traffic, while an irritated driver may be shown a virtual environment with no traffic, a peaceful sunset scenery, and dull colors. Such dynamic virtual aspects allow the warning system 310 to continuously provide augmented reality content that has the best chance of conveying the vehicle communication(s) and corrective vehicle actions to the driver.

Furthermore, the towing module 530 can recognize when a towing configuration is present (e.g., hitchless towing) and adapt to a predetermined set of driving conditions, hazards, and adjustment thresholds that represent defined driving parameters according to, for example, hitchless towing. The towing module 530, in one embodiment, factors in assorted driving, roadway, and following vehicle 220 parameters to prompt one or more vehicle communications that are generated in the form of virtual content shown to the driver 120 via one or more augmented reality displays.

It is noted that the towing module 530 works in concert with correction module 510 to generate vehicle communications along with vehicle actions for mitigating or avoiding the aspects identified in or predicted from the current conditions. For instance, the towing module 530 can identify a safety hazard, which may not be a hazard in a non-towing driving configuration, and prompt the correction module 510 with one or more lead vehicle 210 control actions to mitigate or avoid the identified hazard. For instance, the towing module 530 can respond to sensed data indicating the following vehicle 220 may exceed a defined following range (e.g., too close or too far), such as in response to an upcoming hill. The system 310, in one approach, initiates the correction module 510 to generate a communication specifying a vehicle action to slow down, which is then processed by the augmented reality module 520 to create virtual content conveying the communication and necessary control actions to the driver 120.

Through the input of the towing module 530, the warning system 310 can identify unique safety situations and hazards associated with hitchless towing of a following vehicle 220 as well as what actions are necessary, from a lead vehicle 210, to mitigate or avoid the identified hazard. It is noted that the system 310 can generate vehicle communications according to sensed towing conditions and translate the communications (i.e., identification of current conditions) into vehicle actions to avoid/mitigate current conditions. Furthermore, the system 310 uses the determinations about the current conditions to generate content intended to induce a driver 120 to conduct the vehicle actions. Various embodiments employ the towing module 530 in conjunction with the system processor 330 to efficiently evaluate detected vehicle, roadway, traffic, and driver information to identify current, imminent, and potential future that warrant notifying the driver 120 to alter vehicle control.

Figure 7:
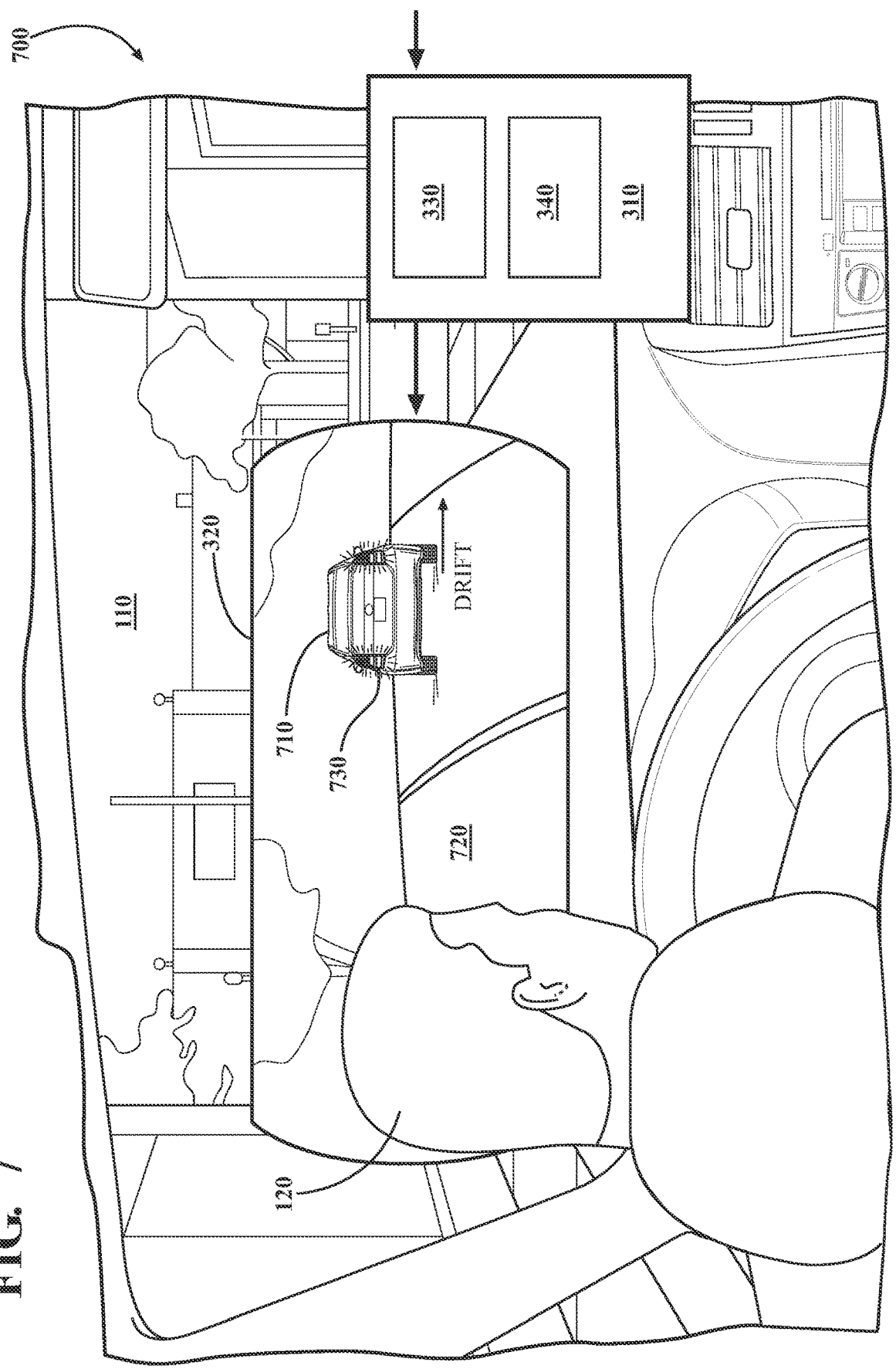
FIG. 7 illustrates one example of an augmented reality display associated with the warning system.

FIG. 7 illustrates an example environment 700 in which a warning system 310 can be employed to provide intelligent communications. The environment 700 shows how an augmented reality interface 320 can display virtual content to the driver 120 to convey one or more vehicle communications translated from the sensor data 550 about current conditions. It is noted that the augmented reality interface 320 may take different forms depending on the implementation, such as a device worn by the driver 120 (e.g., glasses) or as part of a vehicle 110, such as a windshield, screen, visor, panel, or monitor. The augmented reality interface 320 can convey virtual content that is independent of the actual surroundings, such as scenery, roadway, objects, and so on, but generally functions as a way to combine virtual content as an overlay onto the viewed surroundings.

The warning system 310 converts information and data detected from one or more sensors into vehicle communications that correspond to at least one current or future safety hazard and/or dangerous condition, which are subsequently translated by the system processor 330 into vehicle actions to mitigate/avoid the identified hazards/dangers as well as virtual content derived therefrom and displayed on the interface 320. That is, the warning system 310 can initially analyze the sensor data 550 to produce a determination of a current condition of the leading vehicle 210 and the following vehicle 220. The current condition indicates a state of the vehicles 210/220, relationships between the vehicles 210/220, and aspects about the surrounding environment, such as hazardous/dangerous situations. The warning system 310, in at least one arrangement, uses information from the current condition to compare against one or more adjustment thresholds to determine when to provide a communication that results in the output of, for example, the virtual vehicle on the augmented display 720.

In the non-limiting example of the virtual environment displayed in FIG. 7, a virtual vehicle 710 is travelling in front of the driver 120 and begins to laterally drift in response to encountered wind of the virtual environment, which may correspond with trees, leaves, or other wind indicating surroundings. The virtual vehicle 710 drifting can indicate both that dangerous/hazardous winds are currently present and that the driver 120 should slow down to prevent wind from creating a safety condition in the future. Such drifting behavior of the virtual vehicle 710 can be particularly effective at conveying a variety of different hazards and safety conditions while towing (either traditionally or hitchlessly) a following vehicle 220. For instance, a towing module of the warning system 310 can convey nearly any hazard and safety condition requiring a reduction in speed with the drifting shown in FIG. 7, such as too much distance between lead/follow vehicles, upcoming sharp turns, upcoming steep grade, or slow traffic ahead. It should be appreciated that while an adjustment threshold (e.g., predefined range, relative speeds, lateral positions, etc.) is generally described as a point of comparison for determining when to generate communications via the virtual vehicle, in various aspects, the warning system 310 also defines, for example, specific conditions, such as weather (e.g., wind), traffic events, etc. as conditions that induce the conveyance of specific vehicle actions using the virtual vehicle.

In some embodiments, the virtual environment conveys hitchless towing of a vehicle and activity, such as drifting, sliding, and separation. The ability to convey one or more vehicle communications with the virtual vehicle 710 rendered within the display 720 can be complemented by display of changing surroundings, such as blowing foliage, fast passing traffic, slow traffic, or approaching animals/objects to efficiently convey a vehicle communication as well as vehicle control actions to mitigate/avoid current conditions and/or hazards. As a result, the warning system 310 can identify a diverse array of hazards and conditions for towing and non-towing arrangements while correlating those aspects into virtual content that conveys vehicle warnings/communications in the form of inferred control actions per animations of the virtual vehicle 710.

Through the evaluation and processing of detected conditions into virtual content, the warning system 310 can provide augmented reality displays that are easily understood and that the warning system 310 generates to trigger accurate vehicle actions from the driver 120. However, the warning system 310 is not limited to showing virtual content directly relating to the communication being conveyed to the driver 120. In other words, the warning system 310 can convey a need to change a behavior (e.g., slow down) to the driver 120 via the particular way in which the system 310 generates the virtual vehicle, such as by illuminating brake lights 730 of a virtual vehicle 710 or showing an event that will induce the driver 120 to perform a desired vehicle action.

Figure 8:
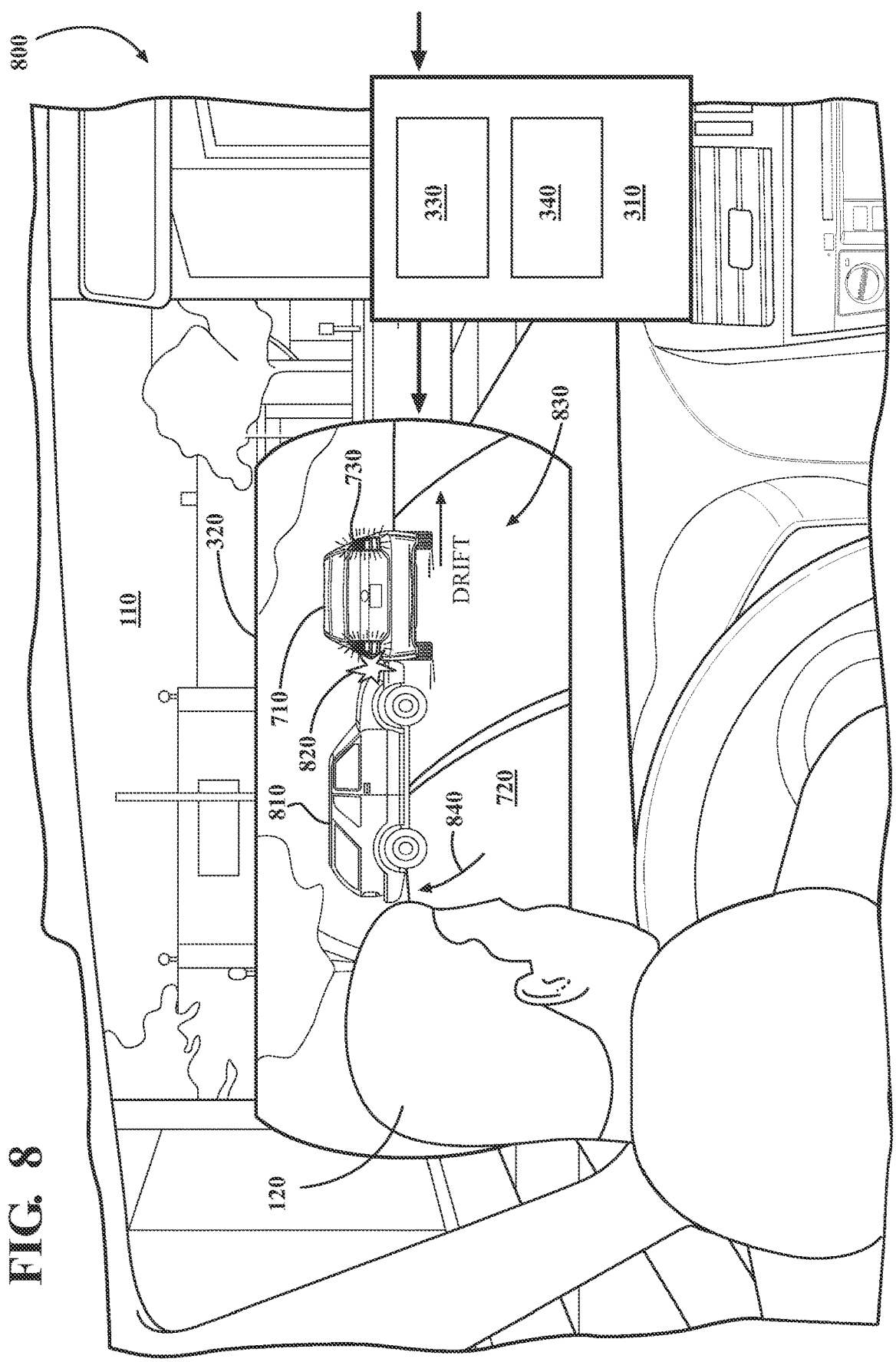
FIG. 8 illustrates another example of an augmented reality display.

FIG. 8 illustrates portions of an example vehicle environment 800 in which assorted embodiments of a warning system 310 convey vehicle communications to a driver 120 via virtual content displayed on an augmented reality interface 320. As a non-limiting example of the capabilities of the warning system 310, a secondary virtual vehicle 810 can be shown to collide with a primary virtual vehicle 710, as illustrated by collision 820 with a symbol. Such collision 820 can be customized for size, distance, and severity to convey a variety of different vehicle communications, such as slow down, hazard ahead, move over, brake cautiously, etc.

It is contemplated that the surroundings 830 of the virtual environment can be altered over time to complement the activity of the virtual vehicle(s) 710/810. For instance, the virtual surroundings 830 can transition colors, objects, and/or sizes of some, or all, of the sky, roadway, and/or road shoulder to emphasize the virtual content, attract attention of the driver 120, and/or aid understanding of what vehicle actions are necessary to avoid future safety conditions. For example, the warning system 310 can create color gradients, place an object close to a virtual vehicle 710/810, or remove content to focus the driver's attention, aid in the driver's understanding of the intended vehicle communications, or promote more accurate vehicle control responsive to activity of the virtual environment.

One embodiment of the warning system 310 adds text, symbols, arrows, or other indicators to the virtual environment displayed within the augmented reality display 320. The addition of virtual aspects beyond virtual vehicles 710/810, as illustrated by arrow 840, can provide context to a driver 120 and further increase the speed and accuracy of both the understanding of what vehicle communications are being shown and what vehicle control actions are necessary to maintain a safe driving condition.

It is contemplated that the warning system 310, in at least one approach, animates, moves, or changes colors of various portions of virtual objects (e.g., virtual vehicle, added text, symbols, arrows, and outlines) in response to a behavior of the driver 120, such as failing to respond within a predetermined time, responding incorrectly to a displayed virtual content, and so on. For instance, the warning system 310 can convey an initial virtual environment as part of a warning strategy that evolves at, for example, predetermined time intervals to change the displayed surroundings, followed by adding arrows and highlights before finally animating the arrow as the driver 120 continues to ignore or respond incorrectly. In this way, the warning system 310 can improve the communication of information to the driver 120 to induce desired vehicle actions.

Figure 9:
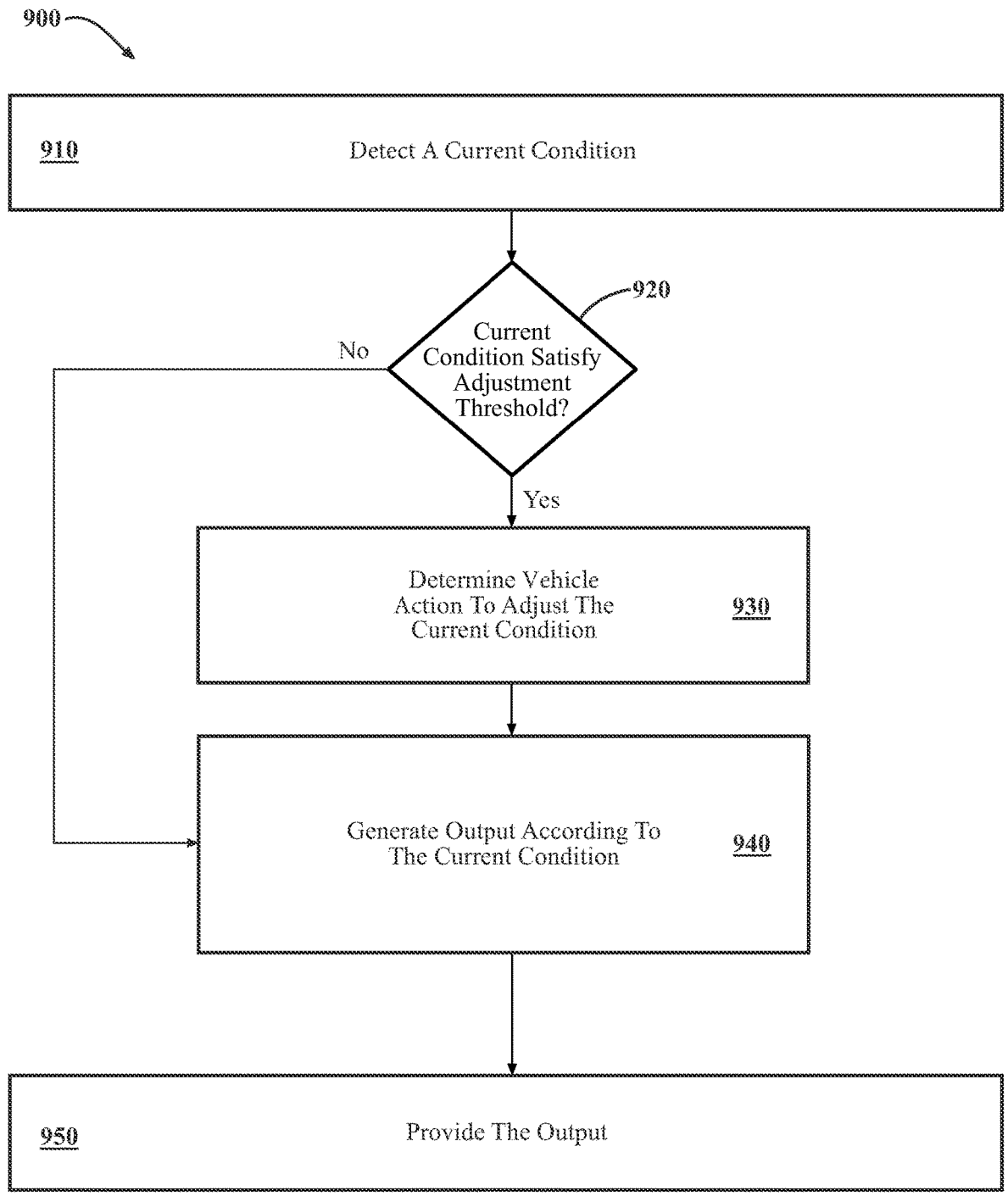
FIG. 9 illustrates a flowchart for one embodiment of a method that is associated with influencing control of a vehicle to improve hitchless towing.

FIG. 9 illustrates a flowchart of a method 900 that is associated with influencing control of a vehicle to improve hitchless towing. Method 900 will be discussed from the perspective of the warning system 310 of FIGS. 3-6. While method 900 is discussed in combination with the warning system 310, it should be appreciated that the method 900 is not limited to being implemented within the warning system 310 but is instead one example of a system that may implement the method 900.

Through activation of assorted circuitry of a warning system 310, one or more warning strategies can be generated and stored in local memory 340 to aid in the translation of vehicle and/or driving conditions detected at 910 into vehicle communications, such as warnings, alerts, instructions, and interactive prompts.

At 910, the warning system 310 detects a current condition associated with a lead vehicle and a following vehicle. As previously described, it is generally understood that the lead vehicle and the following vehicle are engaged in hitchless towing. Hitchless towing involves the following vehicle closely following the lead vehicle as though the lead vehicle is towing the following vehicle; however, there is no physical connection between the vehicles. Instead, in various configurations, the following vehicle is operating autonomously to sense the lead vehicle and the surrounding environment and to generate automated control inputs that maintain the following vehicle within a defined range of the lead vehicle (e.g., 2 to 3 meters). Moreover, the lead vehicle may also function autonomously or may be controlled semi-autonomously or manually. The following vehicle itself may take the form of a trailer for carrying cargo, although, generally, with a configuration of at least four wheels and autonomous systems/sensors for facilitating operation.

In any case, the driver can provide vehicle inputs to adapt operation in the fully autonomous setting or full vehicle controls in the manual setting. These controls or those of the autonomous system of the vehicle may result in the distance between the lead vehicle and the following vehicle varying outside of the defined range according to the occurrence of various conditions, such as weather, traffic, hazards, driver behaviors, and so on. As such, the warning system 310 generally functions to acquire the sensor data 550 and analyze the sensor data 550 to identify current conditions associated with operation. In one approach, the warning system 310 determines at least a distance between the lead vehicle and the following vehicle, and a relative speed between the lead vehicle and the following vehicle. The warning system 310 analyzes the sensor data 550 to identify the current conditions, which may include the noted distance and speed information, but may further include other context information/events, such as the presence of objects, weather conditions, road conditions, and so on. In general, the warning system 310 can detect a wide range of circumstances in order to fully assess the surroundings and improve awareness of the driver through the subsequent communications.

At 920, the warning system 310 determines whether the current condition satisfies an adjustment threshold for modifying a behavior of the vehicle. For example, in one approach, the warning system identifies whether the current condition indicates that a distance between the vehicles exceeds a maximum or a minimum distance. In a further example, the warning system 310 considers whether a relative speed is outside of a defined range. That is, whether the vehicles are separating or coming together. In further aspects, the warning system 310 can determine the occurrence of discrete events/circumstances, such as behaviors of other vehicles, presence of weather or road conditions, and so on. When any of the noted circumstances satisfy the adjustment threshold (e.g., violate a predefined range/speed, occurrence of a defined event, etc.), then the warning system 310 proceeds to generate vehicle actions to mitigate the occurrence. Otherwise, the warning system 310 proceeds to generate an output according to the current conditions that may, for example, indicate proper operation and no need for adjusting controls.

At 930, the warning system 310 determines a vehicle action associated with the current condition. That is, when the warning system 310 determines that action by the driver should be implemented to correct a condition identified at 920, the warning system 310 determines the vehicle action to mitigate the occurrence. In one approach, the warning system 310 determines the vehicle control that adjusts the current condition to within a defined behavior for hitchless towing of the following vehicle. For example, when the distance between the vehicles exceeds the defined range, then the warning system may define the vehicle action to decelerate. Other vehicle actions can include maneuvers of the vehicle 210 to mitigate any occurrence. Thus, the vehicle actions can include steering, braking, and accelerating within defined limits in order to alleviate any condition that has been detected.

By generating what vehicle actions are needed from the driver 120 to mitigate or avoid safety hazards and/or dangerous conditions identified by the warning system 310, the system can reduce a safety threat or other impact of another present condition. As previously described, the warning system 310 may provide a vehicle communication(s) to indicate the vehicle actions.

At 940, the warning system 310 generates an output according to the current conditions. In one arrangement, the warning system 310 generates the output to include the vehicle action when, for example, the system 310 determines the need for the vehicle action according to blocks 920 and 930. Otherwise, when the warning system 310 determines that there is no explicit need to adjust operation, then the system 310 may generate an affirmation that the current control is accurate, which may include providing no feedback or providing positive reinforcement in the form of, for example, a positive audio tone, an indicator lit in green, or another positive response.

Otherwise, at 940, the warning system 310 generates virtual content for use within an augmented reality display or another interface within the vehicle 210. For example, in one approach, the warning system 310 generates graphics in the form of animations or still images of a virtual vehicle to induce the vehicle control actions and cause a defined behavior associated with the vehicle actions (e.g., braking). In general, the warning system 310 generates the virtual content to depict an action by the virtual vehicle that will induce a desired maneuver/vehicle action according to responsive controls of the driver. Thus, at 940, the system 310 proceeds to create augmented reality content that conveys necessary vehicle control actions.

The virtual content may include static and/or dynamic virtual content directed to efficiently inform the driver 120 of driving conditions as well as what actions are needed to improve a current condition, such as bring the vehicles back within the defined range for hitchless towing. In contrast to conventional lights, sounds, and display prompts, the use of augmented reality content that is superimposed over a real-time driving environment can quickly indicate the current, and future driving conditions as well as what vehicle control actions can reduce safety risks. By displaying vehicle communications as virtual vehicles in realistic scenarios, such as braking, drifting, crashing, passing, sliding, etc., the warning system 310 can quickly and accurately induce driving reactions to effect desired vehicle control activity, such as changing lanes, reducing speed, accelerating, increasing following distance, etc. With the use of a towing module 530 of the warning system 310, the virtual environment can convey unique towing hazards, such as excess wind, towing separation, or steep road grade, with relatively simple virtual vehicle activity, such as traffic, brake lights, collisions, and drifting.

It is contemplated, but not required, that the warning system 310 identifies various driver-specific preferences over time. A preference can be a driver's tendency or aptitude for a particular aspect of virtual content, such as color, animation, size, and type of virtual vehicle. A warning system 310 can learn a driver's inclinations in a variety of non-limiting manners. For instance, past logged behavior and responses to virtual content can provide direct matches for the subject matter that contributes to the fastest and/or most accurate vehicle control actions in response to virtual content displayed via augmented reality. Another example attains a driver's preference from one or more models of other drivers, which allows the warning system 310 to customize virtual content with the expectation that a driver's response will be similar to others. In yet another example, a driver's inclination can be attained from a profile compiled by the warning system 310, which can log past responses to virtual content to predict how other virtual content will be understood and interpreted by a driver into vehicle control actions.

The identification, or prediction, of a driver's inclinations allows the warning system 310 to customize virtual content to increase the effectiveness of the product created in step 940. As such, if the warning system 310 determines the virtual content from step 940 contains aspects that match an inclination of the driver 120, decision 950 triggers step 960 to alter the virtual content to cater to the driver's identified inclination, which can increase the speed of response and quality of understanding of the virtual content with respect to what vehicle control actions are necessary to reduce a current, or future, safety threat. The catering of virtual content is not limited to a particular content customization, but can, in some embodiments, involve adding content, such as a highlight, arrow, or text, removing content, such as surroundings or traffic, or altering content, such as changing color, animation, movement, size, or position of a virtual vehicle.

At 950, the warning system 310 outputs the virtual content from 940 within one or more interfaces within the vehicle. For example, in one embodiment, the warning system 310 renders the virtual content within an augmented display depicting a virtual vehicle that is performing a maneuver to influence a control behavior of the lead vehicle. The warning system 310 displays the generated virtual content as part of an augmented reality environment visible to the driver 120. The display of content can be on one or more interfaces, such as a windshield, screen, panel, or surface, that superimposes the virtual content onto portions of the driver's field of view of reality. It is contemplated that step 970 concurrently, or sequentially, displays virtual content in multiple separate interfaces of a vehicle, such as a center console monitor, dashboard monitor, and heads-up portion of a vehicle's windshield. In this way, the warning system 310 is able to generate content to influence control of the vehicle and mitigate current conditions.

FIG. 4 will now be discussed in full detail as an example environment within which the system and methods disclosed herein may operate. In some instances, the vehicle 110 is configured to switch selectively between an autonomous mode, one or more semi-autonomous modes, and/or a manual mode. "Manual mode" means that all of or a majority of the control and/or maneuvering of the vehicle is performed according to inputs received via manual human-machine interfaces (HMIs) (e.g., steering wheel, accelerator pedal, brake pedal, etc.) of the vehicle 110 as manipulated by a user (e.g., human driver). In one or more arrangements, the vehicle 110 can be a manually-controlled vehicle that is configured to operate in only the manual mode.

In one or more arrangements, the vehicle 110 implements some level of automation in order to operate autonomously or semi-autonomously. As used herein, automated control of the vehicle 110 is defined along a spectrum according to the SAE J3016 standard. The SAE J3016 standard defines six levels of automation from level zero to five. In general, as described herein, semi-autonomous mode refers to levels zero to two, while autonomous mode refers to levels three to five. Thus, the autonomous mode generally involves control and/or maneuvering of the vehicle 110 along a travel route via a computing system to control the vehicle 110 with minimal or no input from a human driver. By contrast, the semi-autonomous mode, which may also be referred to as advanced driving assistance system (ADAS), provides a portion of the control and/or maneuvering of the vehicle via a computing system along a travel route with a vehicle operator (i.e., driver) providing at least a portion of the control and/or maneuvering of the vehicle 110.

With continued reference to the various components illustrated in FIG. 1, the vehicle 110 includes one or more processors 330. In one or more arrangements, the processor(s) 330 can be a primary/centralized processor of the vehicle 110 or may be representative of many distributed processing units. For instance, the processor(s) 330 can be an electronic control unit (ECU). Alternatively, or additionally, the processors include a central processing unit (CPU), a graphics processing unit (GPU), an ASIC, a microcontroller, a system on a chip (SoC), and/or other electronic processing units that support operation of the vehicle 110.

The vehicle 110 can include one or more data stores 415 for storing one or more types of data. The data store 415 can be comprised of volatile and/or non-volatile memory. Examples of memory that may form the data store 415 include RAM (Random Access Memory), flash memory, ROM (Read Only Memory), PROM (Programmable Read-Only Memory), EPROM (Erasable Programmable Read- Only Memory), EEPROM (Electrically Erasable Programmable Read-Only Memory), registers, magnetic disks, optical disks, hard drives, solid-state drivers (SSDs), and/or other non-transitory electronic storage medium. In one configuration, the data store 415 is a component of the processor(s) 330. In general, the data store 415 is operatively connected to the processor(s) 330 for use thereby. The term "operatively connected," as used throughout this description, can include direct or indirect connections, including connections without direct physical contact.

In one or more arrangements, the one or more data stores 415 include various data elements to support functions of the vehicle 110, such as semi-autonomous and/or autonomous functions. Thus, the data store 415 may store map data 416 and/or sensor data 419. The map data 416 includes, in at least one approach, maps of one or more geographic areas. In some instances, the map data 416 can include information about roads (e.g., lane and/or road maps), traffic control devices, road markings, structures, features, and/or landmarks in the one or more geographic areas. The map data 416 may be characterized, in at least one approach, as a high-definition (HD) map that provides information for autonomous and/or semi-autonomous functions.

In one or more arrangements, the map data 416 can include one or more terrain maps 417. The terrain map(s) 417 can include information about the ground, terrain, roads, surfaces, and/or other features of one or more geographic areas. The terrain map(s) 417 can include elevation data in the one or more geographic areas. In one or more arrangements, the map data 116 includes one or more static obstacle maps 418. The static obstacle map(s) 418 can include information about one or more static obstacles located within one or more geographic areas. A "static obstacle" is a physical object whose position and general attributes do not substantially change over a period of time. Examples of static obstacles include trees, buildings, curbs, fences, and so on.

The sensor data 419 is data provided from one or more sensors of the sensor system 420. Thus, the sensor data 419 may include observations of a surrounding environment of the vehicle 110 and/or information about the vehicle 110 itself. In some instances, one or more data stores 415 located onboard the vehicle 110 store at least a portion of the map data 416 and/or the sensor data 419. Alternatively, or in addition, at least a portion of the map data 416 and/or the sensor data 419 can be located in one or more data stores 415 that are located remotely from the vehicle 110.

As noted above, the vehicle 110 can include the sensor system 420. The sensor system 420 can include one or more sensors. As described herein, "sensor" means an electronic and/or mechanical device that generates an output (e.g., an electric signal) responsive to a physical phenomenon, such as electromagnetic radiation (EMR), sound, etc. The sensor system 420 and/or the one or more sensors can be operatively connected to the processor(s) 330, the data store(s) 415, and/or another element of the vehicle 110.

Various examples of different types of sensors will be described herein. However, it will be understood that the embodiments are not limited to the particular sensors described. In various configurations, the sensor system 420 includes one or more vehicle sensors 421 and/or one or more environment sensors. The vehicle sensor(s) 421 function to sense information about the vehicle 110 itself. In one or more arrangements, the vehicle sensor(s) 421 include one or more accelerometers, one or more gyroscopes, an inertial measurement unit (IMU), a dead-reckoning system, a global navigation satellite system (GNSS), a global positioning system (GPS), and/or other sensors for monitoring aspects about the vehicle 110.

As noted, the sensor system 420 can include one or more environment sensors 422 that sense a surrounding environment (e.g., external) of the vehicle 110 and/or, in at least one arrangement, an environment of a passenger cabin of the vehicle 110. For example, the one or more environment sensors 422 sense objects the surrounding environment of the vehicle 110. Such obstacles may be stationary objects and/or dynamic objects. Various examples of sensors of the sensor system 420 will be described herein. The example sensors may be part of the one or more environment sensors 422 and/or the one or more vehicle sensors 421. However, it will be understood that the embodiments are not limited to the particular sensors described. As an example, in one or more arrangements, the sensor system 420 includes one or more radar sensors 423, one or more LIDAR sensors 424, one or more sonar sensors 425 (e.g., ultrasonic sensors), and/or one or more cameras 426 (e.g., monocular, stereoscopic, RGB, infrared, etc.).

Continuing with the discussion of elements from FIG. 4, the vehicle 110 can include an input system 430. The input system 430 generally encompasses one or more devices that enable the acquisition of information by a machine from an outside source, such as an operator. The input system 430 can receive an input from a vehicle passenger (e.g., a driver/operator and/or a passenger). Additionally, in at least one configuration, the vehicle 110 includes an output system 435. The output system 435 includes, for example, one or more devices that enable information/data to be provided to external targets (e.g., a person, a vehicle passenger, another vehicle, another electronic device, etc.).

Furthermore, the vehicle 110 includes, in various arrangements, one or more vehicle systems 440. Various examples of the one or more vehicle systems 440 are shown in FIG. 4. However, the vehicle 110 can include a different arrangement of vehicle systems. It should be appreciated that although particular vehicle systems are separately defined, each or any of the systems or portions thereof may be otherwise combined or segregated via hardware and/or software within the vehicle 110. As illustrated, the vehicle 110 includes a propulsion system 441, a braking system 442, a steering system 443, a throttle system 444, a transmission system 445, a signaling system 446, and a navigation system 447.

The navigation system 447 can include one or more devices, applications, and/or combinations thereof to determine the geographic location of the vehicle 110 and/or to determine a travel route for the vehicle 110. The navigation system 447 can include one or more mapping applications to determine a travel route for the vehicle 110 according to, for example, the map data 416. The navigation system 447 may include or at least provide connection to a global positioning system, a local positioning system or a geolocation system.

In one or more configurations, the vehicle systems 440 function cooperatively with other components of the vehicle 110. For example, the processor(s) 410, the warning system 310, and/or automated driving module(s) 460 can be operatively connected to communicate with the various vehicle systems 440 and/or individual components thereof. For example, the processor(s) 330 and/or the automated driving module(s) 460 can be in communication to send and/or receive information from the various vehicle systems 440 to control the navigation and/or maneuvering of the vehicle 110. The processor(s) 330, the warning system 310, and/or the automated driving module(s) 460 may control some or all of these vehicle systems 440.

For example, when operating in the autonomous mode, the processor(s) 330, the warning system 310, and/or the automated driving module(s) 460 control the heading and speed of the vehicle 110. The processor(s) 330, the warning system 310, and/or the automated driving module(s) 460 cause the vehicle 110 to accelerate (e.g., by increasing the supply of energy/fuel provided to a motor), decelerate (e.g., by applying brakes), and/or change direction (e.g., by steering the front two wheels). As used herein, "cause" or "causing" means to make, force, compel, direct, command, instruct, and/or enable an event or action to occur either in a direct or indirect manner.

As shown, the vehicle 110 includes one or more actuators 450 in at least one configuration. The actuators 450 are, for example, elements operable to move and/or control a mechanism, such as one or more of the vehicle systems 440 or components thereof responsive to electronic signals or other inputs from the processor(s) 330 and/or the automated driving module(s) 460. The one or more actuators 450 may include motors, pneumatic actuators, hydraulic pistons, relays, solenoids, piezoelectric actuators, and/or another form of actuator that generates the desired control.

As described previously, the vehicle 110 can include one or more modules, at least some of which are described herein. In at least one arrangement, the modules are implemented as non-transitory computer-readable instructions that, when executed by the processor 330, implement one or more of the various functions described herein. In various arrangements, one or more of the modules are a component of the processor(s) 330, or one or more of the modules are executed on and/or distributed among other processing systems to which the processor(s) 330 is operatively connected. Alternatively, or in addition, the one or more modules are implemented, at least partially, within hardware. For example, the one or more modules may be comprised of a combination of logic gates (e.g., metal-oxide-semiconductor field-effect transistors (MOSFETs)) arranged to achieve the described functions, an application-specific integrated circuit (ASIC), programmable logic array (PLA), field-programmable gate array (FPGA), and/or another electronic hardware-based implementation to implement the described functions. Further, in one or more arrangements, one or more of the modules can be distributed among a plurality of the modules described herein. In one or more arrangements, two or more of the modules described herein can be combined into a single module.

Furthermore, the vehicle 110 may include one or more automated driving modules 460. The automated driving module(s) 460, in at least one approach, receive data from the sensor system 420 and/or other systems associated with the vehicle 110. In one or more arrangements, the automated driving module(s) 460 use such data to perceive a surrounding environment of the vehicle. The automated driving module(s) 460 determine a position of the vehicle 110 in the surrounding environment and map aspects of the surrounding environment. For example, the automated driving module(s) 460 determines the location of obstacles or other environmental features including traffic signs, trees, shrubs, neighboring vehicles, pedestrians, etc.

The automated driving module(s) 460 either independently or in combination with the warning system 310 can be configured to determine travel path(s), current autonomous driving maneuvers for the vehicle 110, future autonomous driving maneuvers and/or modifications to current autonomous driving maneuvers based on data acquired by the sensor system 420 and/or another source. In general, the automated driving module(s) 460 functions to, for example, implement different levels of automation, including advanced driving assistance (ADAS) functions, semi-autonomous functions, and fully autonomous functions, as previously described.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-9, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. The systems, components and/or processes also can be embedded in a computer-readable storage, such as a computer program product or other data program storage device, readable by a machine, tangibly embodying a program of instructions executable by the machine to perform methods and processes described herein. These elements also can be embedded in an application product which comprises the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. A non-exhaustive list of the computer-readable storage medium can include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or a combination of the foregoing. In the context of this document, a computer-readable storage medium is, for example, a tangible medium that stores a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A warning system comprising:
a processor; and
a memory communicably coupled to the processor and storing instructions that, when executed by the processor, cause the processor to:
  detect a current condition associated with a lead vehicle and a following vehicle;
  responsive to determining that the current condition satisfies an adjustment threshold for modifying a behavior of the lead vehicle, determine a vehicle action associated with the current condition; and
  provide an output according to the vehicle action including instructions to generate an augmented reality depiction of a virtual vehicle that is performing a maneuver to influence a control behavior of the lead vehicle in relation to improving hitchless towing of the following vehicle, the maneuver including at least one of braking to portray a reduction in distance from the lead vehicle, steering toward a side of a roadway, and accelerating away from the lead vehicle to cause a driver controlling the lead vehicle to control the lead vehicle responsive to the output.

2. The warning system of claim 1, wherein the lead vehicle is performing hitchless towing for the following vehicle.

3. The warning system of claim 1, wherein the instructions to detect the current condition include instructions to analyze sensor data to identify at least a distance between the lead vehicle and the following vehicle, and a relative speed between the lead vehicle and the following vehicle.

4. The warning system of claim 1, wherein the instructions to determine that the current condition satisfies the adjustment threshold include instructions to identify that the current condition exceeds a maximum or a minimum distance between the lead vehicle and the following vehicle or identifying that a relative speed is outside of a defined range.

5. The warning system of claim 1, wherein the instructions to determine the vehicle action include instructions to determine a vehicle control that adjusts the current condition to within a defined behavior for hitchless towing of the following vehicle.

6. The warning system of claim 5, wherein the instructions to provide the output include instructions to generate a display of a virtual vehicle to induce the vehicle control and cause the defined behavior that improves the hitchless towing.

7. The warning system of claim 1, wherein the instructions to determine the vehicle action include instructions to select the vehicle action to correct a variance between the lead vehicle and the following vehicle, and
wherein the instructions to provide the output include instructions to generate the virtual vehicle to induce the vehicle action in the lead vehicle.

8. The warning system of claim 1, wherein the following vehicle is a hitchless trailer that is controlled autonomously to follow the lead vehicle.

9. A non-transitory computer-readable medium including instructions that, when executed by one or more processors, cause the one or more processors to:
  detect a current condition associated with a lead vehicle and a following vehicle;
  responsive to determining that the current condition satisfies an adjustment threshold for modifying a behavior of the lead vehicle, determine a vehicle action associated with the current condition; and
  provide an output according to the vehicle action including instructions to generate an augmented reality depiction of a virtual vehicle that is performing a maneuver to influence a control behavior of the lead vehicle in relation to improving hitchless towing of the following vehicle, the maneuver including at least one of braking to portray a reduction in distance from the lead vehicle, steering toward a side of a roadway, and accelerating away from the lead vehicle to cause a driver controlling the lead vehicle to control the lead vehicle responsive to the output.

10. The non-transitory computer-readable medium of claim 9, wherein the lead vehicle is performing hitchless towing for the following vehicle.

11. The non-transitory computer-readable medium of claim 9, wherein the instructions to detect the current condition include instructions to analyze sensor data to identify at least a distance between the lead vehicle and the following vehicle, and a relative speed between the lead vehicle and the following vehicle.

12. The non-transitory computer-readable medium of claim 9, wherein the instructions to determine that the current condition satisfies the adjustment threshold include instructions to identify that the current condition exceeds a maximum or a minimum distance between the lead vehicle and the following vehicle or identifying that a relative speed is outside of a defined range.

13. The non-transitory computer-readable medium of claim 9, wherein the instructions to determine the vehicle action include instructions to determine a vehicle control that adjusts the current condition to within a defined behavior for hitchless towing of the following vehicle.

14. A method, comprising:
    detecting a current condition associated with a lead vehicle and a following vehicle;
    responsive to determining that the current condition satisfies an adjustment threshold for modifying a behavior of at least one of the lead vehicle and the following vehicle, determining a vehicle action associated with the current condition; and
    detecting a current condition associated with a lead vehicle and a following vehicle;
    responsive to determining that the current condition satisfies an adjustment threshold for modifying a behavior of the lead vehicle, determining a vehicle action associated with the current condition; and
    providing an output according to the vehicle action including generating an augmented reality depiction of a virtual vehicle that is performing a maneuver to influence a control behavior of the lead vehicle in relation to improving hitchless towing of the following vehicle, the maneuver including at least one of braking to portray a reduction in distance from the lead vehicle, steering toward a side of a roadway, and accelerating away from the lead vehicle to cause a driver controlling the lead vehicle to control the lead vehicle responsive to the output.

15. The method of claim 14, wherein the lead vehicle is performing hitchless towing for the following vehicle.

16. The method of claim 14, wherein detecting the current condition includes analyzing sensor data to identify at least a distance between the lead vehicle and the following vehicle, and a relative speed between the lead vehicle and the following vehicle.

17. The method of claim 14, wherein determining that the current condition satisfies the adjustment threshold includes identifying that the current condition exceeds a maximum or a minimum distance between the lead vehicle and the following vehicle or identifying that a relative speed is outside of a defined range.

18. The method of claim 14, wherein determining the vehicle action includes determining a vehicle control that adjusts the current condition to within a defined behavior for hitchless towing of the following vehicle.

19. The method of claim 18, wherein providing the output includes generating a display of a virtual vehicle to induce the vehicle control and cause the defined behavior that improves the hitchless towing.

20. The method of claim 14, wherein determining the vehicle action includes selecting the vehicle action to correct a variance between the lead vehicle and the following vehicle, and
    wherein providing the output includes generating the virtual vehicle to induce the vehicle action in the lead vehicle.

* * * * *